United States Patent
Kampeas et al.

(10) Patent No.: US 10,869,193 B2
(45) Date of Patent: Dec. 15, 2020

(54) METHOD AND SYSTEM FOR ESTABLISHING SECURED WIRELESS COMMUNICATIONS USING ELECTROMAGNETIC POLARIZATION TECHNIQUES

(71) Applicant: GM GLOBAL TECHNOLOGY OPERATIONS LLC, Detroit, MI (US)

(72) Inventors: Joseph Kampeas, Herzliya (IL); Ofer Givati, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/384,169

(22) Filed: Apr. 15, 2019

(65) Prior Publication Data

US 2020/0329374 A1    Oct. 15, 2020

(51) Int. Cl.
| | |
|---|---|
| H04W 28/04 | (2009.01) |
| H04W 72/04 | (2009.01) |
| H04W 88/08 | (2009.01) |
| H04L 5/00 | (2006.01) |
| H04W 12/04 | (2009.01) |
| H04B 7/0456 | (2017.01) |
| H04B 7/10 | (2017.01) |

(52) U.S. Cl.
CPC .... *H04W 12/04033* (2019.01); *H04B 7/0469* (2013.01); *H04B 7/10* (2013.01); *H04W 12/0401* (2019.01)

(58) Field of Classification Search
CPC ... H04W 28/04; H04W 72/04; H04W 72/042; H04W 88/08; H04L 5/0007
USPC .......................................................... 370/329
See application file for complete search history.

(56) References Cited

U.S. PATENT DOCUMENTS

| | | | | |
|---|---|---|---|---|
| 6,259,730 B1 * | 7/2001 | Solondz | ............... | H04B 7/0671 375/232 |
| 7,675,979 B1 * | 3/2010 | Yu | ............................ | H04B 3/54 375/219 |

(Continued)

*Primary Examiner* — Mark H Rinehart
*Assistant Examiner* — Sanjay K Dewan
(74) *Attorney, Agent, or Firm* — Reising Ethington, P.C.

(57) ABSTRACT

A system and method for establishing secured wireless communications between electromagnetic communication devices. The method may include: generating a transmission polarization mode sequence at a first electromagnetic communication device, wherein the transmission polarization mode sequence includes a first plurality of antenna polarization modes used for transmitting electromagnetic signals; transmitting data from the first electromagnetic communication device using the transmission polarization mode sequence; obtaining a reception polarization mode sequence at the first electromagnetic communication device, wherein the reception polarization mode sequence is generated by a second electromagnetic communication device, and wherein the reception polarization mode sequence includes a second plurality of antenna polarization modes used for listening for electromagnetic signals; determining an initial key based on determining matches between the transmission polarization mode sequence and the reception polarization mode sequence; and carrying out communications between the first electromagnetic communication device and the second electromagnetic communication device based on the initial key.

17 Claims, 7 Drawing Sheets

(56) References Cited

U.S. PATENT DOCUMENTS

| | | | |
|---|---|---|---|
| 7,948,440 B1* | 5/2011 | Honda | H01Q 1/42 |
| | | | 343/715 |
| 8,731,577 B2 | 5/2014 | Bai et al. | |
| 8,818,719 B1 | 8/2014 | Thanayankizil et al. | |
| 8,918,232 B2 | 12/2014 | Lavi et al. | |
| 9,078,125 B2 | 7/2015 | Lavi et al. | |
| 9,894,613 B2 | 2/2018 | Scheim et al. | |
| 10,516,774 B2* | 12/2019 | Landry | H04M 1/7253 |
| 2006/0068760 A1* | 3/2006 | Hameed | H04L 63/18 |
| | | | 455/412.1 |
| 2009/0160607 A1* | 6/2009 | Edwards | B60R 25/24 |
| | | | 340/5.61 |
| 2010/0034386 A1* | 2/2010 | Choong | H04L 9/0866 |
| | | | 380/270 |
| 2010/0188304 A1* | 7/2010 | Clymer | H01Q 13/0258 |
| | | | 343/753 |
| 2011/0298679 A1* | 12/2011 | Elliot | H01Q 9/28 |
| | | | 343/727 |
| 2013/0088391 A1* | 4/2013 | Corman | H01Q 15/242 |
| | | | 342/365 |
| 2014/0066092 A1 | 3/2014 | Scheim et al. | |
| 2014/0194149 A1 | 7/2014 | Lavi et al. | |
| 2014/0297820 A1* | 10/2014 | Grubis | H04L 41/0806 |
| | | | 709/222 |
| 2015/0143125 A1* | 5/2015 | Nix | G06F 21/35 |
| | | | 713/171 |
| 2016/0369651 A1* | 12/2016 | Sobanski | H01P 3/122 |
| 2017/0064547 A1* | 3/2017 | Klaue | H04L 9/0838 |
| 2018/0024226 A1* | 1/2018 | Izadian | G01S 7/03 |
| | | | 342/188 |
| 2018/0040951 A1* | 2/2018 | Uchiyama | H01Q 1/125 |
| 2019/0165460 A1* | 5/2019 | Shiozaki | G01S 7/038 |
| 2019/0190133 A1* | 6/2019 | Izadian | H01Q 21/0037 |
| 2019/0334253 A1* | 10/2019 | Corman | H01Q 21/22 |
| 2020/0259607 A1* | 8/2020 | Xi | H04L 5/0026 |

\* cited by examiner

| 310 | B | A | A | B | A | B | B | A | B | B | A | B |
|-----|---|---|---|---|---|---|---|---|---|---|---|---|
| 312 | A | A | B | B | A | A | B | B | B | A | A | B |
| 320 | 1 | 1 | 0 | 0 | 0 | 1 | 1 | 0 | 1 | 0 | 1 | 0 |
| 340 | - | 1 | - | 0 | 0 | - | - | 1 | 1 | - | 1 | 0 |

METHOD AND SYSTEM FOR ESTABLISHING SECURED WIRELESS COMMUNICATIONS USING ELECTROMAGNETIC POLARIZATION TECHNIQUES

TECHNICAL FIELD

The present invention relates to establishing secured wireless communications between electromagnetic communication devices.

BACKGROUND

Many electronic devices include communication capabilities that are carried out using electromagnetic signals, such as radio waves. These electromagnetic signals can be used to convey data, such as through the use of various modulation techniques. Also, the data that is conveyed over the electromagnetic signals can be encrypted so as to prevent an eavesdropper from obtaining the data being conveyed. However, these encryption schemes can require encryption keys to be exchanged among the devices that seek to carry out confidential or otherwise secured wireless communications.

SUMMARY

According to one aspect, there is provided a method of establishing secured wireless communications between electromagnetic communication devices, the method comprising the steps: generating a transmission polarization mode sequence at a first electromagnetic communication device, wherein the transmission polarization mode sequence includes a first plurality of antenna polarization modes used for transmitting electromagnetic signals; transmitting a bit sequence from the first electromagnetic communication device to a second electromagnetic communication device using the transmission polarization mode sequence; sending the transmission polarization mode sequence from the first electromagnetic communication device to the second electromagnetic communication device; receiving a reception polarization mode sequence at the first electromagnetic communication device from the second electromagnetic communication device, wherein the reception polarization mode sequence includes a second plurality of antenna polarization modes used for receiving electromagnetic signals; determining an initial key based on matches between the transmission polarization mode sequence and the reception polarization mode sequence; and carrying out communications between the first electromagnetic communication device and the second electromagnetic communication device based on the initial key.

According to various embodiments, this method may further include any one of the following features or any technically-feasible combination of some or all of these features:

- the generating step further comprises generating the transmission polarization mode sequence such that the first plurality of antenna polarization modes includes a sequence of horizontal-vertical (HV) polarization modes and slanted polarization modes;
- the generating step further comprises randomly generating the transmission polarization mode sequence at the first electromagnetic communication device;
- the transmitting step further comprises transmitting the bit sequence having a plurality of bit values, each bit value in the bit sequence is polarized according to a particular polarization mode, and the particular polarization mode is based on the transmission polarization mode sequence;
- the transmitting step further comprises receiving the bit sequence having the plurality of bit values at the second electromagnetic communication device, decoding each bit value in the bit sequence at the second electromagnetic communication device, when the second electromagnetic communication device is configured in the same polarization mode as the first electromagnetic communication device for a particular bit value then the second electromagnetic communication device registers the bit value, and when the second electromagnetic communication device is not configured in the same polarization mode as the first electromagnetic communication device for a particular bit value then the second electromagnetic communication device discards the bit value;
- the transmitting step further comprises randomly generating the bit sequence at the first electromagnetic communication device;
- the transmitting step further comprises transmitting the bit sequence with an antenna mounted on a vehicle that is selected with a transceiver mode switch that is controlled by transceiver circuitry;
- the sending step further comprises sending the transmission polarization mode sequence with an antenna mounted on a vehicle that is selected with a transceiver mode switch that is controlled by transceiver circuitry;
- the receiving step further comprises receiving the reception polarization mode sequence with an antenna mounted on a vehicle that is configured with a reception polarization selector that is controlled by transceiver circuitry;
- the determining step further comprises determining the initial key at both the first and second electromagnetic communication devices based on matches between the transmission polarization mode sequence and the reception polarization mode sequence, and a match is detected for a particular bit value when the transmission and reception polarization mode sequences have the same polarization mode for the particular bit value;
- the initial key is a sub-sequence of the bit sequence, and the initial key includes those bit values of the bit sequence that were transmitted and received using the same polarization mode;
- further comprising the step of: determining a shared key based on the initial key;
- the carrying out step further comprises carrying out secured wireless communications between the first and second electromagnetic communication devices according to the shared key;
- the shared key is determined by using a random mapping technique that maps the initial key to the shared key;

According to another aspect, there is provided an electromagnetic communication system, comprising a first electromagnetic communication device and a second electromagnetic communication device, wherein the first and second electromagnetic communication devices each includes: at least one electromagnetic transceiver that includes transceiver circuitry; at least one antenna pair that is coupled to the electromagnetic transceiver; wherein the electromagnetic communication system is configured to: generate a transmission polarization mode sequence at the first electromagnetic communication device and a reception polarization mode sequence at the second electromagnetic communication device; transmit data from the antenna pair of the first electromagnetic communication device using the transmission polarization mode sequence; receive the transmitted data at the antenna pair of the second electromagnetic communication device by listening for transmissions using the reception polarization mode sequence; obtain the transmission polarization mode sequence at the second electromagnetic communication device and the reception polarization mode sequence at the first electromagnetic communication device; at both the first and second electromagnetic communication devices, determine an initial key based on identifying matches between the transmission polarization mode sequence and the reception polarization mode sequence; and carry out communications between the and second electromagnetic communication devices based on the initial key.

According to various embodiments, this system may further include any one of the following features or any technically-feasible combination of some or all of these features:
- each of the first and second electromagnetic communication devices includes a reception polarization selector and two transmission polarization selectors;
- each of the two transmission polarization selectors is coupled to one antenna of the antenna pair, and the reception polarization selector is coupled to both antennas of the antenna pair;
- each of two transmission polarization selectors is capable of selecting between a first polarization mode and a second polarization mode for transmission of electromagnetic signals, and wherein the reception polarization selector is capable of selecting between the first polarization mode and the second polarization mode for reception of electromagnetic signals;

According to yet another aspect, there is provided a method of establishing secured wireless communications between electromagnetic communication devices. The method includes: generating a transmission polarization mode sequence at a first electromagnetic communication device and a reception polarization mode sequence at a second electromagnetic communication device; transmitting data from the first electromagnetic communication device using the transmission polarization mode sequence; receiving the transmitted data at the second electromagnetic communication device based on listening for transmissions using the reception polarization mode sequence; obtaining the transmission polarization mode sequence at the second electromagnetic communication device and the reception polarization mode sequence at the first electromagnetic communication device; at both the first electromagnetic communication device and the second electromagnetic communication device, determining an initial key based on identifying matches between the transmission polarization mode sequence and the reception polarization mode sequence; generating a shared key based on the initial key, wherein the shared key is generated by using a random mapping technique; and carrying out communications between the first electromagnetic communication device and the second electromagnetic communication device based on the shared key.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described herein provide for enabling electromagnetic communication devices to establish secured wireless communications through use of polarization switching techniques. The electromagnetic communication devices can each include at least one electromagnetic transceiver and at least one antenna pair. The antenna pairs can each be used to transmit electromagnetic signals according to a particular polarization and, in at least one embodiment, each antenna of the antenna pair can transmit electromagnetic signals according to two different polarizations. For example, the electromagnetic signals can be polarized horizontally, vertically, or in a slanted manner, such as left/right, circular polarization, slanted at 45°, 135°, etc. with respect a common frame of reference (e.g., Cartesian coordinate system). Each of the particular polarizations can be associated with a particular bit value (e.g., a horizontally-polarized signal can be associated with the bit value of "0", a vertically-polarized signal can be associated with the bit value of "1"). An electromagnetic communication device that receives the polarized electromagnetic signal can detect the polarization of that signal when the electromagnetic communication device is listening using a particular polarization mode. For example, certain polarizations (e.g. a horizontal-polarization) may only be distinguished from other polarizations (e.g., a vertical-polarization) when the electromagnetic communication device is listening along axes parallel and orthogonal to that polarization—that is, along the vertical and horizontal axis in the example given. By listening along the horizontal and vertical axis, the electromagnetic communication device can determine that the electromagnetic signal was horizontally-polarized and not vertically-polarized, which can then indicate the bit value (e.g., a "0" for the horizontal-polarization) being conveyed via the polarizations.

According to at least some embodiments, the system and method herein includes transmitting a random bit sequence using a transmission polarization mode sequence from a first electromagnetic communication device, listening for the random bit sequence at a second electromagnetic communication device using a reception polarization mode sequence, obtaining the transmission polarization mode sequence at the second electromagnetic communication device, obtaining the reception polarization mode sequence at the first electromagnetic communication device, and then determining an initial key at both the first electromagnetic communication device and the second electromagnetic communication device based on matches (or correspondence) between the transmission polarization mode sequence and the reception polarization mode sequence. As discussed more below, this method/system can prevent eavesdroppers from determining the initial key since the eavesdropper would have to listen over many channels (or according to many possible combinations of polarizations), which is based on the number of antennas used, for example. The initial key can be used as a basis for establishing and/or securing electromagnetic communications between the first electromagnetic communication device and the second electromagnetic communication device. In some instances, for example, an eavesdropper may be able to obtain portions of the initial key (e.g., about half of the initial key) when it is transmitted by the first electromagnetic communication device. Also, unlike in certain quantum key distribution techniques, the first electromagnetic communication device and/or the second electromagnetic communication device may not be able to detect or otherwise determine that an eavesdropper is listening. Thus, according to at least some embodiments, a random mapping technique (e.g., a nested coding scheme or technique, universal hashing) can be used to obtain a shared key based on the initial key, which can further secure the electromagnetic communications since having merely portions of the initial key (i.e., some but not all of the bits) does not indicate any of the particular bits or portions of the shared key.

Figure 1:
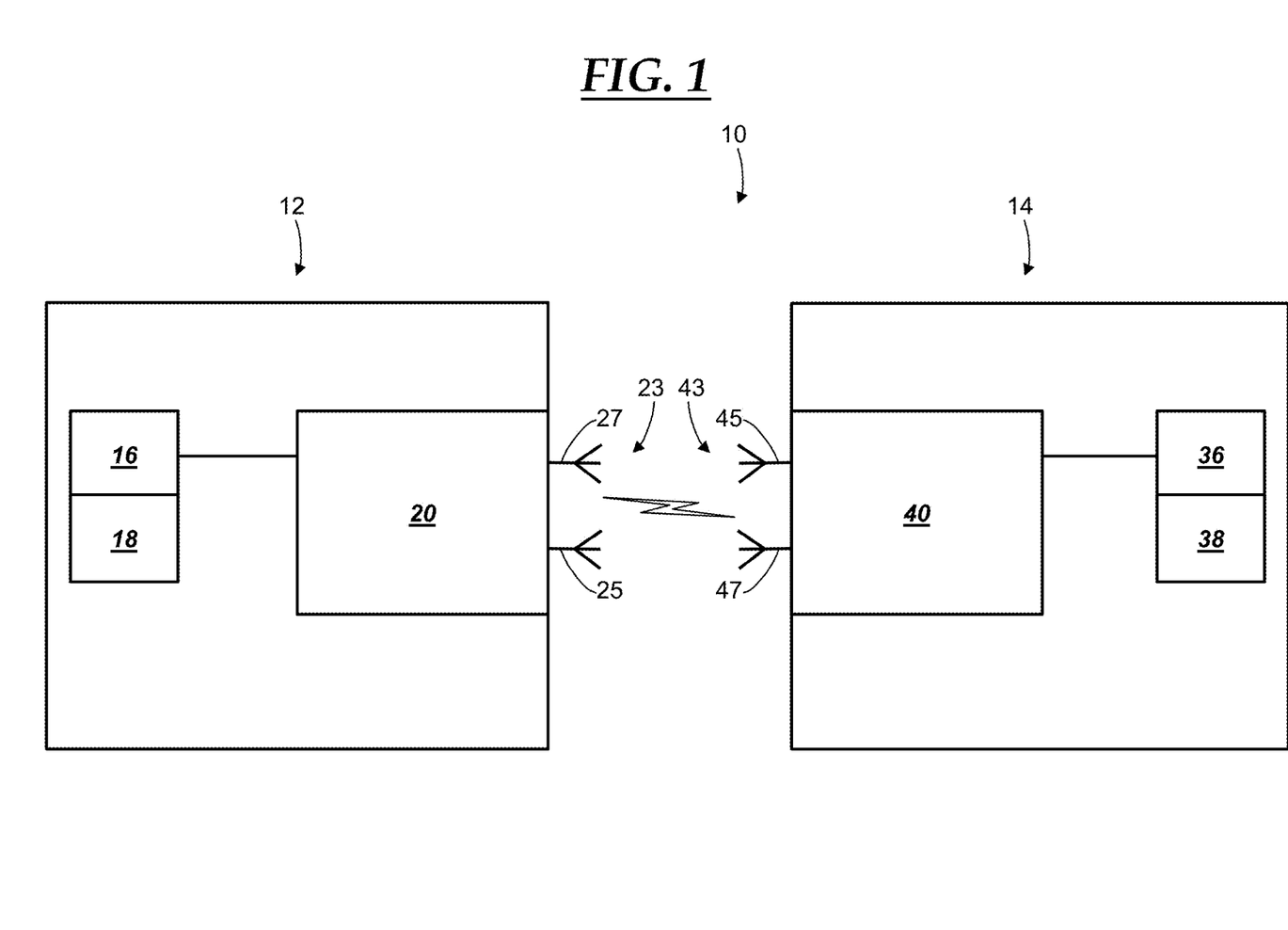
FIG. 1 is a schematic block diagram of an embodiment of an electromagnetic communication system having a first electromagnetic communication device and a second electromagnetic communication device.

FIG. 1 illustrates an embodiment of an electromagnetic communication system 10 that can be used to implement the disclosed method. The electromagnetic communication system 10 includes a plurality of electromagnetic communication devices and, in the illustrated embodiment, includes a first electromagnetic communication device 12 and a second electromagnetic communication device 14. Although the electromagnetic communication system 10 is described herein with respect to two communication devices, the electromagnetic communication system can include more than two electromagnetic communication devices, as well as other components, devices, modules, etc.

Each of the electromagnetic communication devices 12, 14 includes a processor 16, 36, a memory 18, 38, and an electromagnetic transceiver 20, 40, each of which includes at least one antenna pair 23, 43. Although the processor 16, 36 and memory 18, 38 are shown as being separate from the electromagnetic transceiver 20, 40, in some embodiments, the processor 16, 36 and/or the memory 18, 38 can be integrated with or be a part of the electromagnetic transceiver 20, 40, such as being integrated as a part of transceiver circuitry 22, 42 (FIGS. 2-3), which is discussed in more detail below. Although the electromagnetic communication devices 12, 14 are shown as only having a single electromagnetic transceiver 20, 40 and a single antenna pair 23, 43, in other embodiments, the electromagnetic communication devices 12, 14 include a plurality of electromagnetic transceivers and/or a plurality of antenna pairs. For example, the electromagnetic communication devices 12, 14 may be arranged so that a single electromagnetic transceiver includes multiple antenna pairs; they may be arranged so that multiple electromagnetic transceivers utilize a single antenna pair; or they may be arranged so that multiple electromagnetic transceivers include multiple antenna pairs, to cite a few possibilities. Although the embodiments illustrated herein are described as using antenna pairs, in other embodiments, the electromagnetic communication devices can include other antenna configurations.

The processor 16, 36 can be any type of device capable of processing electronic instructions including microprocessors, microcontrollers, host processors, controllers, vehicle communication processors, General Processing Unit (GPU), accelerators, Field Programmable Gated Arrays (FPGA), Digital Signal Processors (DSPs) and Application Specific Integrated Circuits (ASICs), to cite a few possibilities. It can be a dedicated processor used only for the electromagnetic communication device or can be shared with other vehicle systems, devices, components, etc. The processor 16, 36 can execute various types of electronic instructions, such as software and/or firmware programs stored in the memory 18, 38, which enable the electromagnetic communication device to carry out various functionality. The memory 18, 38 can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. In one example, the processor 16, 36 executes programs or processes data and the memory 18, 38 stores programs or other data in order to help carry out or support at least a part of the present method.

Figure 2:
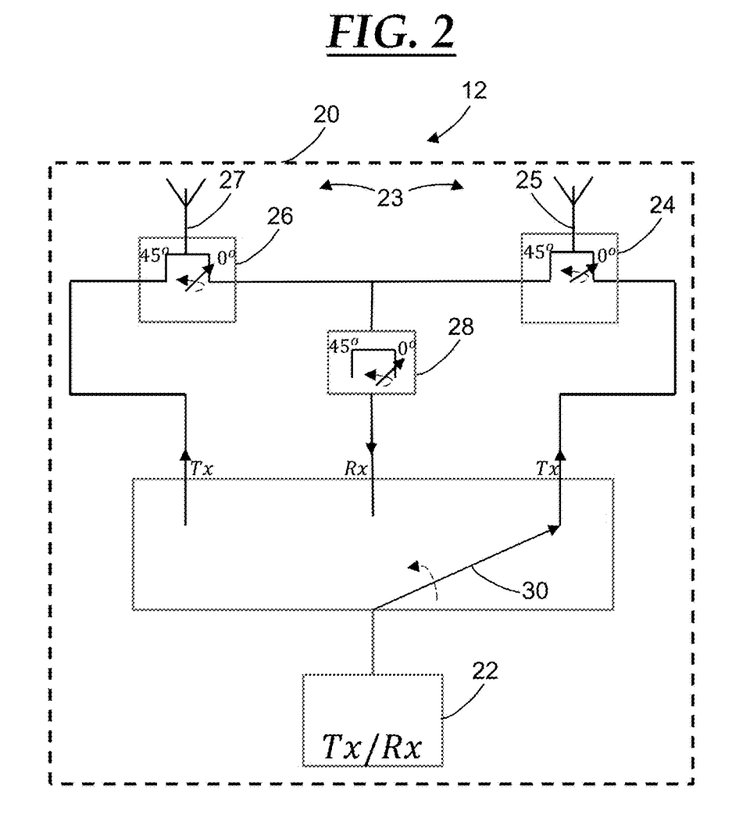
FIG. 2 is a schematic block diagram of an electromagnetic transceiver of the first electromagnetic communication device of FIG. 1.
Figure 3:
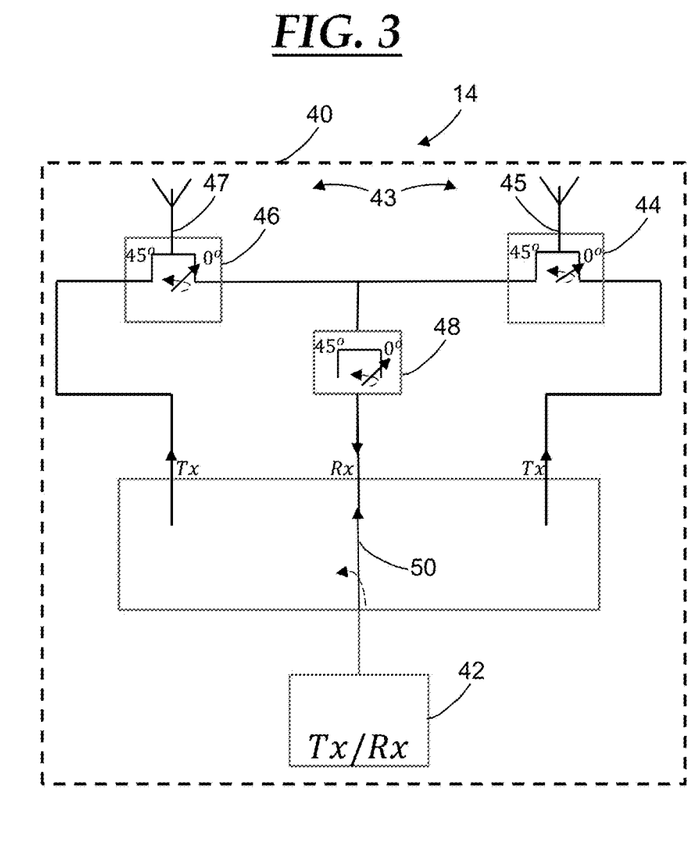
FIG. 3 is a schematic block diagram of an electromagnetic transceiver of the second electromagnetic communication device of FIG. 1.

As shown in FIGS. 2 and 3, the electromagnetic transceiver 20, 40 includes the transceiver circuitry 22, 42 that is used to generate and/or prepare electromagnetic signals for transmission and to process received electromagnetic signals. The transceiver circuitry 22, 42 can be coupled to a first transmission polarization selector 24, 44, a second transmission polarization selector 26, 46, or a reception polarization selector 28, 48 via a transceiver mode switch 30, 50. The transmission polarization selectors are used to select a polarization to be used in transmission of electromagnetic signals, and the reception polarization selectors are used to select a polarization to be used in listening or detecting electromagnetic signals. Each electromagnetic transceiver 20, 40 includes the pair of antennas 23, 43 and each transmission polarization selector is coupled to a single antenna. The reception polarization selector 28, 48 is coupled to both antennas of the pair of antennas. The antenna that is used to transmit electromagnetic signals is selected using the transceiver mode switch 30, 50. The transceiver circuitry 22, 42 can be used to generate electromagnetic signals and to cause them to be transmitted via the selected antenna, which is the antenna that is coupled to the transceiver circuitry 22, 42 via the transceiver mode switch 30, 50 at a particular time. For example, in FIG. 2, the first transceiver 20 is in a transmission mode in which the first antenna 25 is selected via the transceiver mode switch 30.

The transceiver circuitry 22, 42 can include transmitter circuitry that is used for generating and causing the electromagnetic transceiver 20, 40 to transmit electromagnetic signals, and receiver circuitry that is used for processing received electromagnetic signals. In the illustrated embodiment, the transmitter circuitry and the receiver circuitry are integrated into the transceiver circuitry 22, 42. However, according to at least some embodiments, the transmitter circuitry and the receiver circuitry may be a part of a stand-alone module or unit; it may be part of a larger module, unit, system, etc.; it may include a number of sub-modules, sub-units, sub-systems, etc.; or it may be configured according to some other arrangement or architecture so long as it is configured to generate electromagnetic signals for transmission and to receive and process electromagnetic signals in accordance with the method disclosed herein. In some embodiments where the transmitter circuitry and the receiver circuitry are integrated into the same module, such as in the transceiver circuitry 22, 42 of the illustrated embodiment, the transmitter circuitry and the receiver circuitry can share components that may be usable for each of their respective functions. In some embodiments, the processor 16, 36 and/or memory 18, 38 can be incorporated into the transceiver circuitry 22, 42.

In one non-limiting example, the transmitter circuitry includes a baseband processor that is configured to manage radio operations, including the generation of signals for transmission. The baseband processor can include hardware, firmware, and/or software typically found on such transmitters, including random access memory (RAM, including static RAM (SRAM) and dynamic RAM (DRAM)) or other types of memory, including flash memory, other solid state memory, or other suitable memory. The transmitter circuitry can include waveform generators, oscillators, amplifiers, mixers, combiners, filters, converters and/or processors, to name just a few possible components.

The receiver circuitry is configured to process received electromagnetic signals that are sent from another electromagnetic communication device. According to a non-limiting example, the receiver circuitry includes hardware, firmware, and/or or software typically found on receivers such as, without limitation, amplifiers, mixers, de-mixers, oscillators, combiners, filters, and converters. The functions performed by receiver circuitry may vary, and can include performing various filtering, amplification, conversion and digitizing functions, as well as signal processing functions like analyzing various properties of the signals and waveforms to determine information such as phase, frequency, and amplitude. In one embodiment, the receiver circuitry may include a baseband processor and, in some embodiments, the transceiver circuitry 20, 40 can include a common baseband processor that is used as a part of both the transmitter circuitry and the receiver circuitry. For example, and as mentioned above, all or part of the receiver circuitry and the transmitter circuitry can be integrated into the transceiver circuitry 20, 40.

The electromagnetic transceivers 20, 40 are capable of transmitting electromagnetic waves having a particular polarization, which can be, for example, a vertical polarization, a horizontal polarization, a +45° polarization, or a −45° polarization. The particular polarization can be used to indicate a bit (i.e., a one or a zero) or to otherwise convey data from the first electromagnetic communication device 12 to the second electromagnetic communication device 14 or vice versa. The electromagnetic transceivers 20, 40 can be used to transmit a sequence of electromagnetic signals that each have a particular polarization, which is referred to herein as an "electromagnetic signal sequence." The electromagnetic transceivers 20, 40 can also be used to receive an electromagnetic signal sequence and to determine the particular polarization of each of the electromagnetic signals of the electromagnetic signal sequence.

As mentioned above, the electromagnetic transceivers 20, 40 each include the transceiver circuitry 22, 42, the transceiver mode switch 30, 50, an antenna pair 23, 43, the first transmission polarization selector 24, 44, the second transmission polarization selector 26, 46, and the reception polarization selector 28, 48. The first transmission polarization selector 24, 44 includes a first antenna 25, 45 and the second transmission polarization selector 26, 46 includes a second antenna 27, 47. As depicted in FIGS. 2-3, the first transmission polarization selector 24, 44 and the second transmission polarization selector 26, 46 can each be switched between a horizontal-vertical (HV) polarization mode and a slanted polarization mode—that is, for the first transmission polarization selector 24, 44, either the HV polarization mode can be selected or the slanted polarization mode can be selected, and for the second transmission polarization selector 26, 46, either the HV polarization mode can be selected or the slanted polarization mode can be selected. The HV polarization mode corresponds to electromagnetic signals that are polarized in the horizontal direction (i.e., 0° or 180°) or in the vertical direction (i.e., 90° or 270°). The slanted polarization mode corresponds to transmissions that are offset by 45° from the horizontal or vertical direction (i.e., 45°, 135°, 225°, and 315°, which can be referred to as a positive slanted axis (i.e., slanted along 45°/225°) and a negative slanted axis (i.e., slanted along 135°/315°)).

The HV polarization mode of the first transmission polarization selector 24, 44 is used to transmit electromagnetic waves having a first HV polarization and the HV polarization mode of the second transmission polarization selector 26, 46 is used to transmit electromagnetic waves having a second HV polarization that is offset by 90° from (or orthogonal to) the first HV polarization. For example, in the HV polarization mode, the first transmission polarization selector 24, 44 is set so that the electromagnetic transceiver 20, 40 transmits horizontally-polarized electromagnetic signals and, in the HV polarization mode, the second transmission polarization selector 26, 46 is set so that the electromagnetic transceiver 20, 40 transmits vertically-polarized electromagnetic signals. The slanted polarization mode of the first transmission polarization selector 24, 44 is used to transmit electromagnetic waves having a first slanted polarization, and the slanted polarization mode of the second transmission polarization selector 26, 46 is used to transmit electromagnetic waves having a second slanted polarization that is offset by 90° from the first slanted polarization. For example, when the first transmission polarization selector 24, 44 is set to the slanted polarization mode, the electromagnetic transceiver 20, 40 can be used to transmit (+45)-polarized electromagnetic signals and, when the second transmission polarization selector 26, 46 is set to the slanted polarization mode, the electromagnetic transceiver 20, 40 can be used to transmit (−45)-polarized electromagnetic signals. As used herein, (+45)-polarized electromagnetic signals are electromagnetic signals that are polarized at 45° (or 225°), and (−45)-polarized electromagnetic signals are electromagnetic signals that are polarized at 135° (or 315°). Thus, each electromagnetic transceiver 20, 40 is able to transmit electromagnetic waves having one of four possible polarizations—that is, horizontally-polarized electromagnetic signals, vertically-polarized electromagnetic signals, (+45)-polarized electromagnetic signals, and (−45)-polarized electromagnetic signals.

According to at least some embodiments, only one antenna (e.g., the first antenna 25 and not the second antenna 27) is used to transmit electromagnetic signals at a time and this currently-selected or used antenna can be selected using the transceiver mode switch 30, 50. For example, as shown in FIG. 2, the first electromagnetic transceiver 20 is set or configured to a transmission mode in which electromagnetic signals are transmitted using the first antenna 25 and not the second antenna 27. Also, in addition to selecting one of the two antennas for transmission, the polarization of the electromagnetic signal(s) to be transmitted can be set using the transmission polarization selector of the selected antenna.

The electromagnetic transceiver 20, 40 can also receive electromagnetic signals and includes a single reception polarization selector 28, 48 that is coupled to both the first antenna 25, 45 and the second antenna 27, 47. The electromagnetic transceiver 20, 40 can be set to the reception mode using the transceiver mode switch 30, 50. For example, the second electromagnetic transceiver 40 is in the reception mode since the transceiver mode switch 50 is set so as to couple or connect the reception polarization selector 48 to the transceiver circuitry 42. In the reception mode, the reception polarization selector 28, 48 can itself be set to detect electromagnetic signals transmitted using either the HV polarization mode or the slanted polarization mode. For example, the reception polarization selector 28 can be set to the HV polarization mode in which the first antenna 25 is used to detect horizontally-polarized electromagnetic signals and the second antenna 27 is used to detect vertically-polarized electromagnetic signals. As another example, the single reception polarization selector 28 can be set to the slanted polarization mode in which the first antenna 25 is used to detect (+45)-polarized electromagnetic signals and the second antenna 27 is used to detect (−45)-polarized electromagnetic signals.

When the polarization mode used for reception (or "reception polarization mode") does not correspond to the polarization mode used for transmission (or "transmission polarization mode"), then the particular polarization of the electromagnetic waves cannot accurately be determined. For example, when the first electromagnetic transceiver 20 transmits an electromagnetic signal using the HV polarization mode and the second transceiver 40 is in the slanted polarization mode, the second transceiver 40 cannot distinguish between whether the transmitted electromagnetic signal is horizontally-polarized or vertically-polarized since the electromagnetic signal is detected along the positive slanted axis and the negative slanted axis and not the horizontal or vertical axes. The positive slanted axis and the negative slanted axis are offset by 45° with respect to the horizontal axis and the vertical axis and, thus, the second transceiver 40 that receives the transmitted signals detects the same (or substantially the same) intensities along the positive slanted axis and the negative slanted axis thereby rendering the second transceiver unable to determine whether the transmitted electromagnetic signal was horizontally-polarized or vertically-polarized.

However, when the reception polarization mode of one electromagnetic transceiver does correspond to the transmission polarization mode of another electromagnetic transceiver, then the particular polarization of the electromagnetic waves can accurately be determined. For example, when the first transceiver 20 transmits a horizontally-polarized electromagnetic signal using the HV polarization mode and the second transceiver 40 is set to a reception mode (via transceiver mode switch 50) and to the HV polarization mode (using the transmission polarization selectors 44, 46), the second transceiver 40 can determine that the transmitted electromagnetic signal is horizontally-polarized since the detected intensity along the horizontal axis sufficiently exceeds (or is otherwise distinguishable from) the detected intensity along (or other properties with respect to) the vertical axis. This matching of the transmission polarization mode and the reception polarization mode can be exploited to carry out secured wireless communications between two electromagnetic communication devices, as will be discussed in more detail below.

Figure 4:
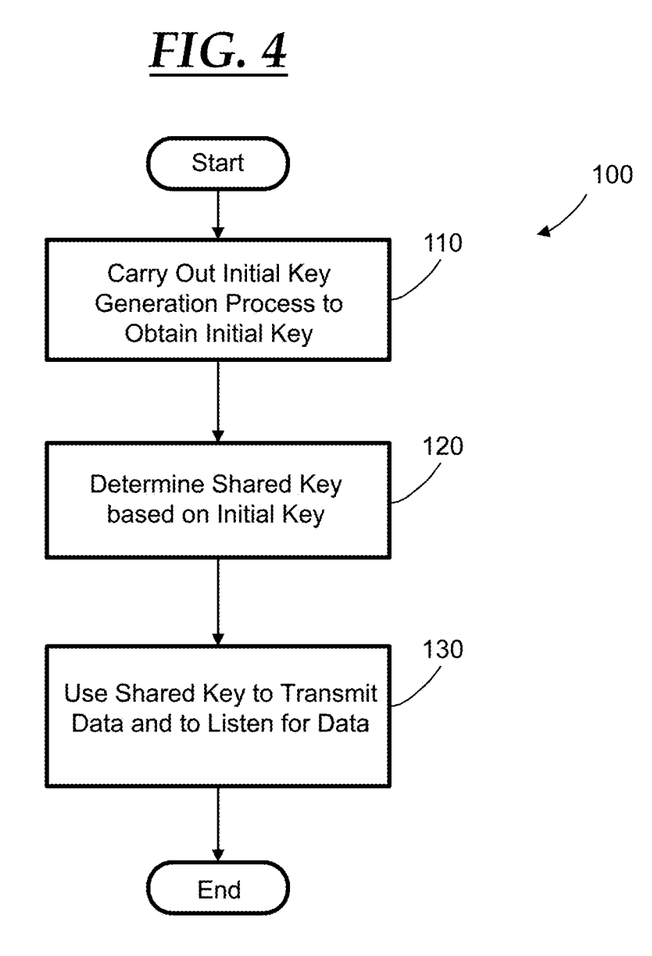
FIG. 4 is a flowchart depicting an embodiment of a method of establishing secured wireless communications between electromagnetic communication devices.
Figure 5:
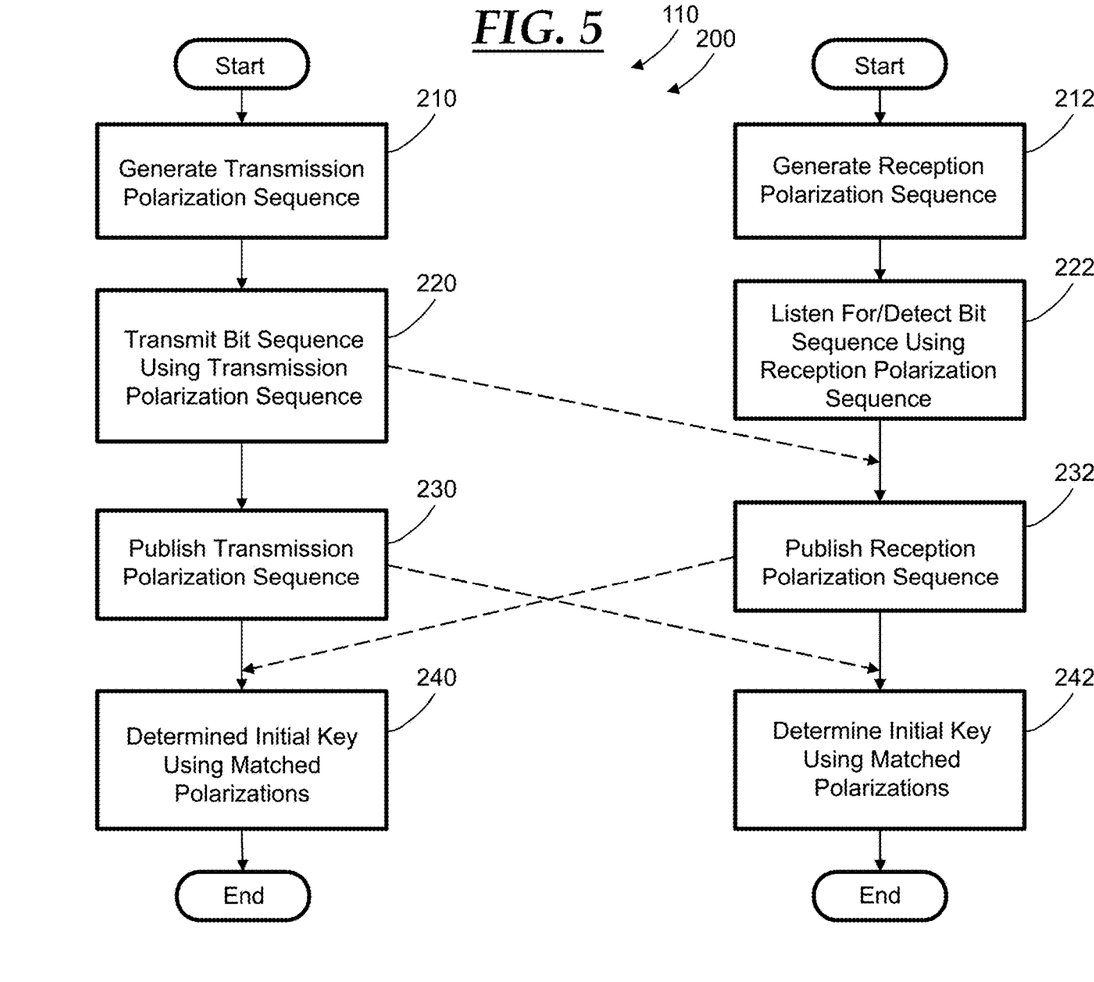
FIG. 5 is a flowchart depicting an embodiment of initial key generation process that may be used as a part of the method of FIG. 4.

With reference to FIG. 4, there is shown a method 100 of establishing secured wireless communications between two electromagnetic communication devices. The method 100 is carried out by the electromagnetic communication system 10. The method 100 begins with step 110 wherein an initial key generation process is carried out. With reference to FIG. 5, there is shown a non-limiting example of an initial key generation process 110 where steps 210, 220, 230, and 240 are carried out by the first electromagnetic communication device 12, and steps 212, 222, 232, and 242 are carried out by the second electromagnetic communication device 14. Other examples are certainly possible.

The initial key generation process 110 begins with steps 210 and 212, wherein the first electromagnetic communication device generates a transmission polarization mode sequence (step 210) and the second electromagnetic communication device generates a reception polarization mode sequence (step 212). The transmission polarization mode sequence is a series or sequence of antenna polarization modes that are to be used to transmit a bit sequence in step 220. The antenna polarization modes include the HV transmission mode and the slanted transmission mode. An example of a transmission polarization mode sequence 310 is shown in the first row of the table of FIG. 6 with "A" representing the HV polarization mode and "B" representing the slanted polarization mode. The reception polarization mode sequence is a series or sequence of antenna polarization modes that are to be used to detect the bit sequence sent in step 220. An example of a reception polarization mode sequence 312 is shown in the second row of the table of FIG. 6 and in FIG. 7 with the "+" indicating the HV polarization mode and the "X" indicating the slanted polarization mode. In at least some embodiments, the transmission polarization mode sequence and the reception polarization mode sequence are generated randomly, such as through use of a pseudorandom generator or generation module, which can be embedded in the processor 16, 36 or other component of the electromagnetic communication devices 12, 14 (e.g., the transceiver circuitry 22, 42). The transmission polarization mode sequence and the reception polarization mode sequence can be generated using various methods or techniques, but (at least in some embodiments) these polarization sequences should be kept secret or secured. The process 200 then continues to steps 220 and 222.

Figure 6:
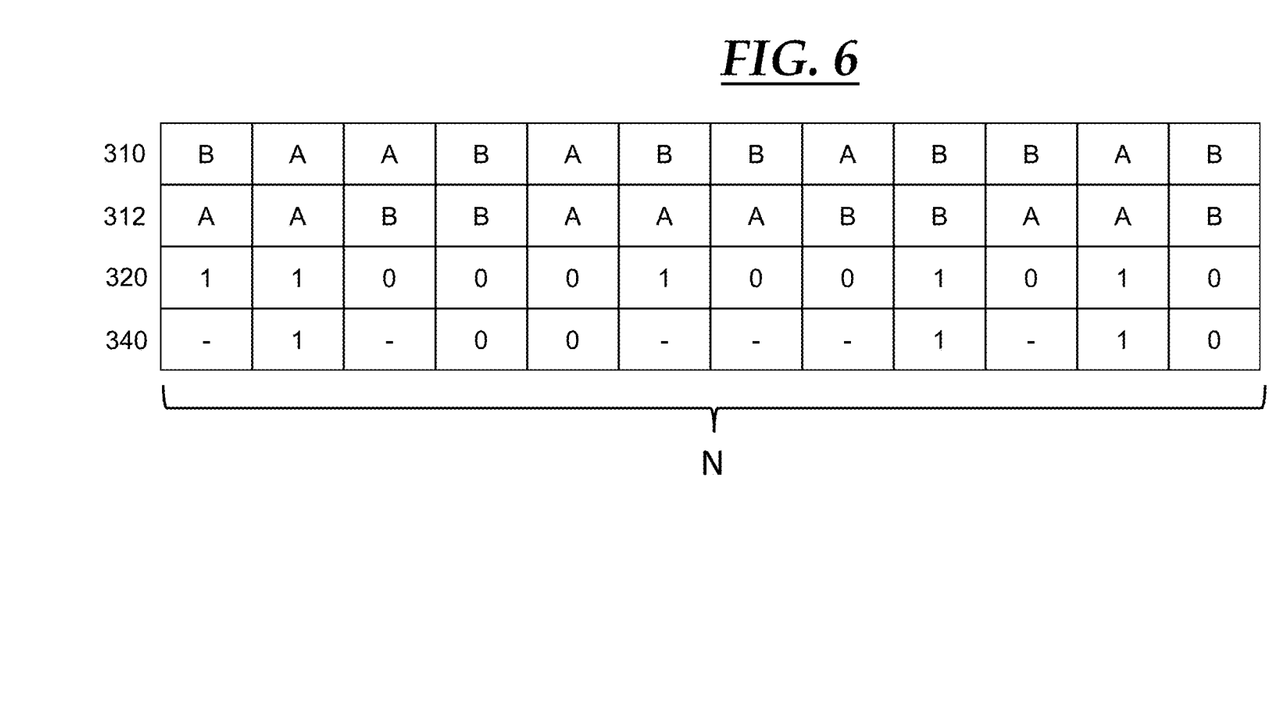
FIG. 6 is a table showing an example of a transmission polarization mode sequence, a reception polarization mode sequence, a bit sequence, and an initial key obtained as a part of an exemplary scenario that uses the initial key generation process of FIG. 5.

In step 220, the first electromagnetic communication device transmits a bit sequence using the transmission polarization mode sequence generated in step 210. The bit sequence is a series or sequence of bits that is used to obtain an initial key. In FIG. 6, there is shown an exemplary bit sequence 320. This bit sequence 320 can be obtained from memory 18, 38 and/or may be randomly generated. In the HV polarization mode, a first bit value (e.g., "0") can be assigned to or otherwise associated with a first HV polarization (e.g., horizontally-polarized) and a second bit value (e.g., "1") can be assigned to or otherwise associated with a second HV polarization (e.g., vertically-polarized). In the slanted polarization mode, a first bit value (e.g., "0") can be assigned to or otherwise associated with a first slanted polarization (e.g., (+45)-polarized) and a second bit value (e.g., "1") can be assigned to or otherwise associated with a second slanted polarization (e.g., (−45)-polarized). In the example discussed herein with respect to FIG. 6, the bit value of "0" corresponds to the horizontal-polarization when in the HV polarization mode and to the (+45)-polarization when in the slanted polarization mode, and the bit value of "1" corresponds to the vertical-polarization when in the HV polarization mode and to the (−45)-polarization when in the slanted polarization mode. Of course, in other embodiments, the association or correspondence of bit values to particular polarizations can be switched around as the present example is but only one possibility. Once the bit sequence and the transmission polarization mode sequence are generated or otherwise obtained by the first electromagnetic communication device 12, then the first electromagnetic communication device 12 can transmit the bit sequence 320 using the transmission polarization mode sequence 310. The bit sequence 320 is transmitted as an electromagnetic signal sequence that includes a series or sequence of electromagnetic signals that are to be transmitted according to the associated polarization (e.g., horizontally-polarized, vertically-polarized, (+45)-polarized, (−45)-polarized), which is based on the polarization mode and the values of the bit sequence.

Figure 7:
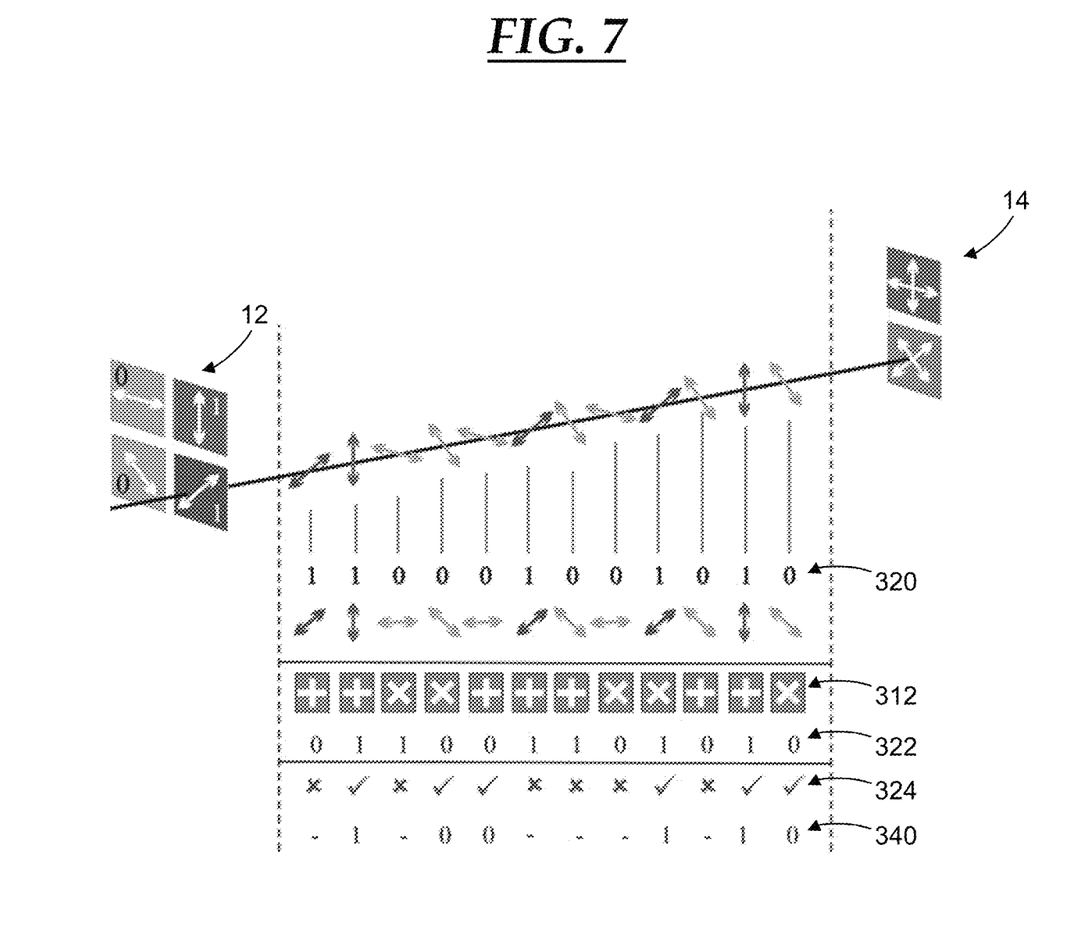
FIG. 7 is a diagram depicting polarizations used for transmitting the exemplary bit sequence of FIG. 6, as well as compatibility between the transmission polarization mode sequence and the reception polarization mode sequence.

For example, as shown in FIGS. 6 and 7, the first polarization mode of the transmission polarization mode sequence 310 is "B", which corresponds to the slanted polarization mode in this example, and the first bit of the bit sequence 320 is "1", so the first electromagnetic signal of the transmitted electromagnetic signal sequence is (−45)-polarized. Next in this example, the second polarization mode of the transmission polarization mode sequence 310 is "A", which corresponds to the HV polarization mode, and the second bit of the bit sequence 320 is "1", so the second electromagnetic signal of the transmitted electromagnetic signal sequence is to have a vertically-polarized. Next in this example, the third polarization mode of the transmission polarization mode sequence 310 is "A", which corresponds to the HV polarization mode, and the third bit of the bit sequence 320 is "0", so the third electromagnetic signal of the transmitted electromagnetic signal sequence is horizontally-polarized. As shown in FIG. 5, the dashed arrow from the step 220 to the solid arrow between steps 222 and 232 represents the transmitted electromagnetic signal sequence from one electromagnetic device to the other.

In step 222, the second electromagnetic communication device listens for or detects the transmitted electromagnetic signal sequence using the reception polarization mode sequence. For example, the first polarization mode of the reception polarization mode sequence 312 is "A", which corresponds to the HV polarization mode. As discussed above, in this example, the polarization used for the first electromagnetic signal of the transmitted electromagnetic signal sequence is (−45)-polarized, which is not distinguishable or detectable by the second electromagnetic communication device 14 since the device 14 is using the HV polarization mode for listening or detecting the first electromagnetic signal—that is, the device 14 is using the HV polarization mode as the reception polarization mode for the first electromagnetic signal. Next in this example, the polarization used for the second electromagnetic signal of the transmitted electromagnetic signal sequence is vertically-polarized, which is distinguishable or detectable by the second electromagnetic communication device 14 since the device 14 is using the HV polarization mode as the reception polarization mode for the second electromagnetic signal. Skilled artisans will appreciate that when device 14 is configured in the HV polarization mode, it can detect either horizontally or vertically polarized signals; and when device 14 is configured in the slanted polarization mode, it can detect either +45 or −45 polarized signals. This continues for the remaining ten electromagnetic signals of the electromagnetic signal sequence. The length of the electromagnetic signal sequence can be denoted by N, which is twelve (12) in the example of FIG. 6. As can be seen in FIG. 7, the detected bit values 322 do not necessarily correspond to those bit values of the bit sequence (or the transmitted electromagnetic signal sequence) when the polarization mode of the transmission is different, as the polarizations of the electromagnetic signals are not distinguishable. The process 200 then continues to step 230 and 232.

In step 230, the first electromagnetic communication device publishes or otherwise indicates the transmission polarization mode sequence to the second electromagnetic communication device. In step 232, the second electromagnetic communication device publishes or otherwise indicates the reception polarization mode sequence to the first electromagnetic communication device. The dashed arrow extending from step 230 to the solid arrow between steps 232 and 242 represents the publishing of the transmission polarization mode sequence, and the dashed arrow extending from step 232 to the solid arrow between steps 230 and 240 represents the publishing of the reception polarization mode sequence. In one embodiment, the first electromagnetic communication device and the second electromagnetic communication device can be set to the same predetermined or established polarization mode (e.g., the HV polarization mode) and can then transmit a series of electromagnetic signals that includes a plurality of electromagnetic signals, each of which has a polarization (e.g., horizontally-polarized, vertically-polarized) that is used to convey the antenna polarization modes used in the transmission polarization mode sequence or the reception polarization mode sequence. For example, with respect to the transmission polarization mode sequence 310, the first electromagnetic communication device 12 can transmit a horizontally-polarized electromagnetic signal for each "A" (which corresponds to the HV polarization mode) and a vertically-polarized electromagnetic signal for each "B" (which corresponds to the slanted polarization mode). The same can be done by the second electromagnetic communication device 14 for the reception polarization mode sequence 312. Other forms of communications can be used by each of the electromagnetic communication devices to communicate the transmission polarization mode sequence or the reception polarization mode sequence to the other electromagnetic communication device(s). The process 200 then continues to steps 240 and 242.

In step 240, the first electromagnetic communication device determines the initial key based on matching which antenna polarization modes of the transmission polarization mode sequence correspond to those of the reception polarization mode sequence. In step 242, the second electromagnetic communication device determines the initial key based on matching which antenna polarization modes of the reception polarization mode sequence correspond to those of the transmission polarization mode sequence. For example, in the example of FIGS. 6 and 7, the second, fourth, fifth, ninth, eleventh, and twelfth antenna polarization modes of the transmission polarization mode sequence match the second, fourth, fifth, ninth, eleventh, and twelfth antenna polarization modes of the reception polarization mode sequence, respectively. In FIG. 7, the compatibility (or matching) is shown at 324 in which the checks represent a match between the reception polarization mode and the transmission polarization mode, and the small "x" characters represent a mismatch between the reception polarization mode and the transmission polarization mode. Thus, the first electromagnetic communication device 12 and the second electromagnetic communication device 14 determine that the initial key is "100110" as shown in FIG. 6 as initial key 340. The process 200 then ends, and the method 100 proceeds to step 120 in FIG. 4.

In step 120, a shared key is determined based on the initial key. The first and second electromagnetic communication devices can determine the shared key based on the initial key. In at least some embodiments, a random mapping technique can be used to map the initial key to a shared key. The random mapping technique can be used by the first and second electromagnetic communication devices to improve security. For example, during the initial key generation process, an eavesdropper may learn certain portions of the bit sequence that is used to generate the initial key by listening using its own polarization sequence (or an eavesdropper polarization sequence). Thus, any matches between the eavesdropper polarization sequence and the transmission sequence will result in the eavesdropper being able to determine the bit of that electromagnetic signal that corresponds to the matched polarizations. Although it is unlikely that the eavesdropper will learn the initial key after one transmission of the bit sequence (since the eavesdropper would have to listen using the correct polarization for each of the matching polarizations of the transmission polarization mode sequence and the reception polarization mode sequence, which are unknown until after the electromagnetic signal sequence is transmitted), the eavesdropper may still learn portions of the initial key. Thus, by using the random mapping technique, it makes it more difficult for an eavesdropper to learn the key used during communications. Various random mapping techniques can be used, including universal hashing techniques, nested coding scheme techniques, or distributed source coding techniques.

In one example of a random mapping technique, the first and second electromagnetic communication devices can have a dictionary or a mapping table (or other suitable structure) that maps data (e.g., data to be communicated) to a random code. As mentioned above, the eavesdropper may be able to determine some of the bit sequence that is being transmitted by virtue of the eavesdropper polarization sequence matching the transmission polarization mode sequence. Thus, while it is unlikely that the eavesdropper will be able to determine every bit of the bit sequence (or data being transmitted), the eavesdropper may be able to determine portions of the bit sequence (or data being transmitted). However, if a random code is used to represent the data being transmitted, learning certain portions of the random code as it is being transmitted will not reveal as much (if any) of the data being transmitted since the whole code is needed to determine any portion or bit of the data. After the shared key is established, the method 100 proceeds to step 130.

In step 130, the shared key is used to carry out communications between the first and second electromagnetic communication devices. The shared key can be used to select the polarizations used for a transmission polarization mode sequence and for a reception polarization mode sequence such that the transmission polarization mode sequence and the reception polarization mode sequence are the same. For example, when the first electromagnetic communication device is to send data to the second electromagnetic communication device, the first electromagnetic communication device transmits the data using a first transmission polarization mode sequence as an electromagnetic signal sequence. The second electromagnetic communication device can then receive and determine the data encoded in the electromagnetic signal sequence based on the reception polarization mode sequence. The second electromagnetic communication device can send data to the first electromagnetic communication device using the same process in which the second electromagnetic communication device uses a transmission polarization mode sequence to transmit the data as an electromagnetic signal sequence.

In at least one embodiment, the first and second electromagnetic communication devices can carry out numerous two-way communications back and forth. Also, in some embodiments, the shared key that is used to obtain the polarizations for the transmission polarization mode sequence and the reception polarization mode sequence can be periodically changed so as to make it more difficult for an eavesdropper to determine the polarizations of the transmission polarization mode sequence and the reception polarization mode sequence. Various techniques can be used, such as using a hashing techniques, nonce and/or token techniques, etc. The method 100 then ends.

Figure 8:
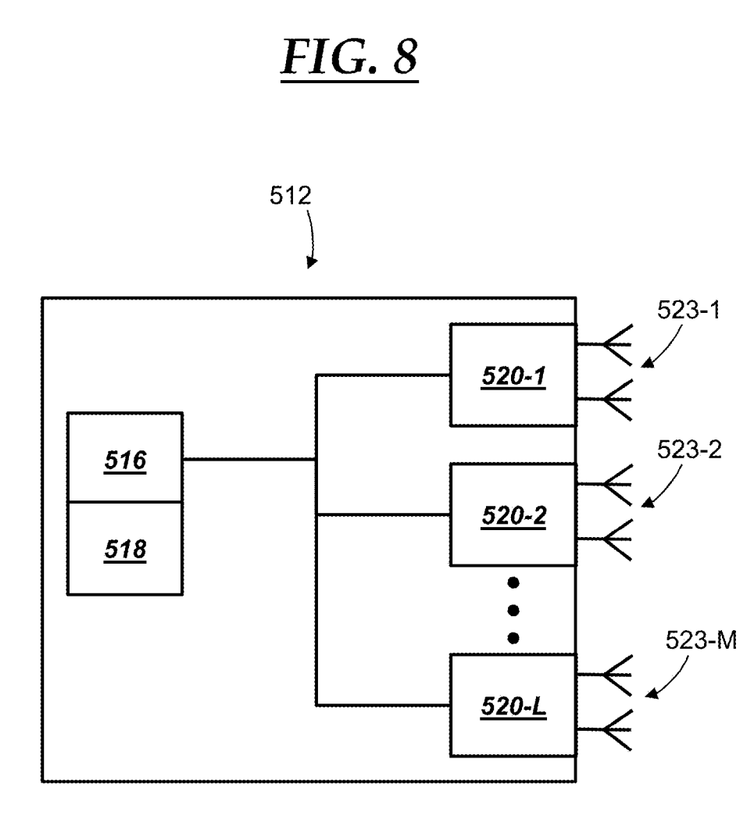
FIG. 8 is an embodiment of an electromagnetic communication device that includes a plurality of electromagnetic transceivers and a plurality of an antenna pairs.

With reference to FIG. 8, there is shown another embodiment of an electromagnetic communication device 512 that includes a plurality of electromagnetic transceivers 520-1 through 520-L each having an antenna pair 523-1 through 523-M, where M is the number of antenna pairs (in this example, the number of electromagnetic transceivers equals the number of antenna pairs, but this is not required). The electromagnetic communication device 512 can be used in an electromagnetic communication system, such as system 10 discussed above. The electromagnetic communication device 512 can use the plurality of electromagnetic transceivers 520-1 through 520-L for communications, as well as for the initial key generation process. The initial key generation process can be used to transmit bits from the M antenna pairs. The electromagnetic signals (which represent data of the initial key) can be transmitted at different time intervals, or may be transmitted at the same (or overlapping) times and according to one or more modulation (or other channel separation) techniques. On average, for a bit sequence of length N, the average number of bits that are valid (or those that are able to be determined or detected since the polarizations of the transmission polarization mode sequence and the reception polarization mode sequence are matched) is N/2M.

As mentioned above, an eavesdropper may be able to determine portions of the initial key if the eavesdropper is listening using polarizations that match those of the transmission polarization mode sequence used to transmit the bit sequence. The probability that the eavesdropper will have a matching polarization to both the first electromagnetic communication device and the second electromagnetic communication device is $1/2^{2M}$ for each of antenna pair that is used by the eavesdropper. Accordingly, for a bit sequence of length N, the average number of bits that are capable of being determined by the eavesdropper (or average number of "leaked bits") is $N*M_E/2^{2M}$, where $M_E$ is the number of antenna pairs being used by the eavesdropper. Thus, when $M_E=2^M$, the initial key may be determined by the eavesdropper. Therefore, by increasing the number of antenna pairs used by the first electromagnetic communication device and the second electromagnetic communication device, the number of antenna pairs needed by the eavesdropper to determine the initial key increases exponentially.

As mentioned above, to further improve the security of the wireless communications between the first electromagnetic communication device and the second electromagnetic communication device, a random mapping technique is used to obtain a shared key based on the initial key generated as a result of the initial key generation process, as mentioned above in step 120. Additionally, the shared key can be used to generate a dictionary or other mapping structure that maps data to be communicated (e.g., a bit sequence) to a seemingly-random bit sequence. Both of the first electromagnetic communication device and the second electromagnetic communication device can use the shared key to determine this common mapping structure so that the transmitted seemingly-random bit sequence is capable of being mapped to the data being conveyed.

In one embodiment, a nested coding scheme or technique can be used to create the common mapping structure, an example of which is described below. Every bit sequence of length k (a total of $2^k$ bit sequences) is generated and assigned to a bin of having $2^{k/2}$ sub-sequences, and where there are $2^{k/2}$ total bins. The sub-sequences can be randomly assigned and the bins (including their master bit sequence and their sub-sequences) can be generated in a seemingly random fashion based on the shared key, such as through using hashing techniques. Each bin can be associated with a master bit sequence of length k/2, and each sub-sequence of each bin is a bit sequence of length k/2. Then, when the first electromagnetic communication device is to send a bit sequence of length k/2, the first electromagnetic communication device can identify the bin that matches the bit sequence (i.e., that is associated with the master bit sequence) to be sent and can then randomly select a sub-sequence within that corresponding bin. The randomly-selected sub-sequence can then be communicated to the second electromagnetic device, which can then locate the bin that the sub-sequence belongs to. The associated master bit sequence can then be obtained and, thus, the data being conveyed from the first electromagnetic communication device to the second electromagnetic communication device is obtained.

The electromagnetic communication system and devices can be incorporated into a number of different systems or devices, such as a vehicle communication system. In one embodiment, the first electromagnetic communication device is incorporated into a first vehicle and the second electromagnetic communication device is incorporated into a second vehicle. The method discussed above can be used to establish secured wireless communications between the first vehicle and the second vehicle. In another embodiment, the first electromagnetic communication device is a part of a first module of a first vehicle and the second electromagnetic communication device is a part of a second module of the first vehicle. The method discussed above can be used to establish secured wireless communications between the first module and the second module. In a more particular embodiment, the first module and/or the second module can be a sensor of the first vehicle, such as a radar unit, a lidar unit, a camera, a wheel speed sensor, a door open/close sensor, etc.

According to some embodiments, the initial key generation process can be used for line-of-sight (LOS) communications. However, in other embodiments, the initial key generation process can be used for non-line-of-sight (NLOS) communications. In such embodiments, a polarization offset is evaluated prior to transmitting the bit sequence. In one embodiment, the polarization offset can be obtained by transmitting a training sequence in a predefined polarization (or a polarization known to both the first electromagnetic communication device and second electromagnetic communication device) for each electromagnetic signal, which enables the electromagnetic communication device receiving these electromagnetic signals to assess the polarization offset. The electromagnetic communication device receiving these electromagnetic signals can then adjust the polarizations according to this polarization offset. The initial key generation process can then be carried out.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of establishing secured wireless communications between electromagnetic communication devices, the method comprising the steps:

generating a transmission polarization mode sequence at a first electromagnetic communication device, the transmission polarization mode sequence includes a first plurality of antenna polarization modes used for transmitting electromagnetic signals, wherein the first plurality of antenna polarization modes includes a random sequence of horizontal-vertical (HV) polarization modes and slanted polarization modes;

transmitting a bit sequence from the first electromagnetic communication device to a second electromagnetic communication device according to the transmission polarization mode sequence;

sending the transmission polarization mode sequence from the first electromagnetic communication device to the second electromagnetic communication device;

receiving a reception polarization mode sequence at the first electromagnetic communication device from the second electromagnetic communication device, the reception polarization mode sequence includes a second plurality of antenna polarization modes used for receiving electromagnetic signals, wherein the second plurality of antenna polarization modes includes a random sequence of horizontal-vertical (HV) polarization modes and slanted polarization modes;

determining an initial key based on matches between the transmission polarization mode sequence and the reception polarization mode sequence; and
carrying out communications between the first electromagnetic communication device and the second electromagnetic communication device based on the initial key.

2. The method of claim 1, wherein the transmitting step further comprises transmitting the bit sequence having a plurality of bit values, each bit value in the bit sequence is polarized according to a particular polarization mode, and the particular polarization mode is based on the transmission polarization mode sequence.

3. The method of claim 2, wherein the transmitting step further comprises receiving the bit sequence having the plurality of bit values at the second electromagnetic communication device, decoding each bit value in the bit sequence at the second electromagnetic communication device, when the second electromagnetic communication device is configured in the same polarization mode as the first electromagnetic communication device for a particular bit value then the second electromagnetic communication device registers the bit value, and when the second electromagnetic communication device is not configured in the same polarization mode as the first electromagnetic communication device for a particular bit value then the second electromagnetic communication device discards the bit value.

4. The method of claim 2, wherein the transmitting step further comprises randomly generating the bit sequence at the first electromagnetic communication device.

5. The method of claim 1, wherein the transmitting step further comprises transmitting the bit sequence with an antenna mounted on a vehicle that is selected with a transceiver mode switch that is controlled by transceiver circuitry.

6. The method of claim 1, wherein the sending step further comprises sending the transmission polarization mode sequence with an antenna mounted on a vehicle that is selected with a transceiver mode switch that is controlled by transceiver circuitry.

7. The method of claim 1, wherein the receiving step further comprises receiving the reception polarization mode sequence with an antenna mounted on a vehicle that is configured with a reception polarization selector that is controlled by transceiver circuitry.

8. The method of claim 1, wherein the determining step further comprises determining the initial key at both the first and second electromagnetic communication devices based on matches between the transmission polarization mode sequence and the reception polarization mode sequence, and a match is detected for a particular bit value when the transmission and reception polarization mode sequences have the same polarization mode for the particular bit value.

9. The method of claim 8, wherein the initial key is a sub-sequence of the bit sequence, and the initial key includes those bit values of the bit sequence that were transmitted and received using the same polarization mode.

10. The method of claim 1, further comprising the step of:
determining a shared key based on the initial key.

11. The method of claim 10, wherein the carrying out step further comprises carrying out secured wireless communications between the first and second electromagnetic communication devices according to the shared key.

12. The method of claim 11, wherein the shared key is determined by using a random mapping technique that maps the initial key to the shared key.

13. An electromagnetic communication system, comprising a first electromagnetic communication device and a second electromagnetic communication device, wherein the first and second electromagnetic communication devices each includes:
at least one electromagnetic transceiver that includes transceiver circuitry;
at least one antenna pair that is coupled to the electromagnetic transceiver;
wherein the electromagnetic communication system is configured to:
generate a transmission polarization mode sequence at the first electromagnetic communication device and a reception polarization mode sequence at the second electromagnetic communication device, the transmission polarization mode sequence includes a first plurality of antenna polarization modes used for transmitting electromagnetic signals, wherein the first plurality of antenna polarization modes includes a random sequence of horizontal-vertical (HV) polarization modes and slanted polarization modes, and the reception polarization mode sequence includes a second plurality of antenna polarization modes used for receiving electromagnetic signals, wherein the second plurality of antenna polarization modes includes a random sequence of horizontal-vertical (HV) polarization modes and slanted polarization modes;
transmit data from the antenna pair of the first electromagnetic communication device using the transmission polarization mode sequence;
receive the transmitted data at the antenna pair of the second electromagnetic communication device by listening for transmissions using the reception polarization mode sequence;
obtain the transmission polarization mode sequence at the second electromagnetic communication device and the reception polarization mode sequence at the first electromagnetic communication device;
at both the first and second electromagnetic communication devices, determine an initial key based on identifying matches between the transmission polarization mode sequence and the reception polarization mode sequence; and
carry out communications between the and second electromagnetic communication devices based on the initial key.

14. The electromagnetic communication system of claim 13, wherein each of the first and second electromagnetic communication devices includes a reception polarization selector and two transmission polarization selectors.

15. The electromagnetic communication system of claim 14, wherein each of the two transmission polarization selectors is coupled to one antenna of the antenna pair, and the reception polarization selector is coupled to both antennas of the antenna pair.

16. The electromagnetic communication system of claim 15, wherein each of two transmission polarization selectors is capable of selecting between a first polarization mode and a second polarization mode for transmission of electromagnetic signals, and wherein the reception polarization selector is capable of selecting between the first polarization mode and the second polarization mode for reception of electromagnetic signals.

17. A method of establishing secured wireless communications between electromagnetic communication devices, the method comprising the steps:

generating a transmission polarization mode sequence at a first electromagnetic communication device and a reception polarization mode sequence at a second electromagnetic communication device, wherein the transmission polarization mode sequence and the reception polarization mode sequence each includes a random sequence of polarization modes;

transmitting data from the first electromagnetic communication device using the transmission polarization mode sequence;

receiving the transmitted data at the second electromagnetic communication device based on listening for transmissions using the reception polarization mode sequence;

obtaining the transmission polarization mode sequence at the second electromagnetic communication device and the reception polarization mode sequence at the first electromagnetic communication device;

at both the first electromagnetic communication device and the second electromagnetic communication device, determining an initial key based on identifying matches between the transmission polarization mode sequence and the reception polarization mode sequence;

generating a shared key based on the initial key, wherein the shared key is generated by using a random mapping technique; and carrying out communications between the first electromagnetic communication device and the second electromagnetic communication device based on the shared key.

* * * * *